US006736748B2

(12) United States Patent
Schneider et al.

(10) Patent No.: US 6,736,748 B2
(45) Date of Patent: May 18, 2004

(54) ROLLER WITH AXIAL TRAVEL

(75) Inventors: Georg Schneider, Würzburg (DE); Wolfgang Otto Reder, Veitshöchheim (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 0 days.

(21) Appl. No.: 10/239,168

(22) PCT Filed: Mar. 23, 2001

(86) PCT No.: PCT/DE01/01124

§ 371 (c)(1),
(2), (4) Date: Sep. 24, 2002

(87) PCT Pub. No.: WO01/72516

PCT Pub. Date: Oct. 4, 2001

(65) Prior Publication Data

US 2003/0104894 A1 Jun. 5, 2003

(30) Foreign Application Priority Data

Mar. 24, 2000 (DE) .......................................... 100 14 853

(51) Int. Cl.[7] ............................ B41F 31/14; F16H 1/32; F16H 23/00

(52) U.S. Cl. ............................... 475/178; 74/52; 74/60; 101/348; 101/DIG. 38

(58) Field of Search .......................... 475/178; 74/22 R, 74/22 A, 52, 60, 826; 101/148, 348, DIG. 38

(56) References Cited

U.S. PATENT DOCUMENTS

| | | | | |
|---|---|---|---|---|
| 4,428,290 A | * | 1/1984 | Junghans et al. | 101/348 |
| 4,711,171 A | | 12/1987 | Theilacker | |
| 4,914,981 A | | 4/1990 | Hummel et al. | |
| 5,103,726 A | * | 4/1992 | Wieland | 101/350.3 |
| 5,230,285 A | | 7/1993 | Cogswell et al. | |
| 5,544,547 A | | 8/1996 | Ishimaru | |
| 5,619,922 A | * | 4/1997 | Kelm | 101/216 |
| 5,713,280 A | * | 2/1998 | Kelm et al. | 101/142 |
| 6,318,238 B1 | | 11/2001 | Becker et al. | |

FOREIGN PATENT DOCUMENTS

| | | |
|---|---|---|
| DE | 2 045 717 | 3/1972 |
| DE | 32 41 863 A1 | 5/1984 |
| DE | 35 40912 A1 | 5/1987 |
| DE | 37 31 244 A1 | 3/1989 |
| DE | 39 35 422 A1 | 4/1990 |
| DE | 44 29 093 A1 | 4/1995 |
| DE | 42 14 210 C2 | 12/1995 |
| DE | 197 37 540 A1 | 3/1999 |
| EP | 0 340 428 A2 | 11/1989 |
| EP | 0 607 283 B1 | 3/1997 |
| GB | 2 281 536 A | 3/1995 |
| WO | WO 93/06999 | 4/1993 |

* cited by examiner

*Primary Examiner*—Richard M. Lorence
(74) *Attorney, Agent, or Firm*—Jones, Tullar & Cooper, P.C.

(57) ABSTRACT

A distributing roller includes a roller sleeve and a gear located on the interior of the roller. The gear generates a rotational speed of a roller inner shaft that is different from the rotational speed of the roller sleeve. A bearing, that is supported obliquely on the roller inner shaft, with respect to the roller axis of rotation, generates an axial travel of the roller sleeve with respect to the roller shaft.

15 Claims, 3 Drawing Sheets

ROLLER WITH AXIAL TRAVEL

FIELD OF THE INVENTION

The present invention is directed to a roller which has axial travel while it rotates. An obliquely arranged bearing in the roller's interior supports an outer shell of the roller.

BACKGROUND OF THE INVENTION

A roller for accomplishing the axial movement of the roller shell is known from EP 0 607 283 B1. A rotary movement is converted into an axial displacement movement. This takes place in that a difference in the number of revolutions is created between the roller and cylindrical elements located in the roller interior by use of a gear, so that a lifting or axial displacement movement of the roller shell is generated by using a cam unit.

DE 39 35 422 A1 discloses a coupling with coupling halves which are arranged eccentrically in relation to each other.

DE 32 41 863 C1 discloses a jack hammer with a rotating tumbler disk.

SUMMARY OF THE INVENTION

The object of the present invention is directed to providing a roller with axial lift or travel.

In accordance with the present invention, this object is attained by positioning a bearing obliquely to the roller axis of rotation in the interior of the roller. One race of the bearing is stationary in respect to the axial direction of the roller. The other race of the bearing is connected to an outer shell of the roller.

The advantages which can be achieved by the present invention reside, in particular, in that a compact structural unit is provided, which unit can be installed without problems in rollers with larger roller diameters, as well as in rollers with lesser roller diameters. The length of the roller axial displacement or lift can be set.

High manufacturing costs are avoided by using simple components, such as roller bearings or ball and socket joints.

BRIEF DESCRIPTION OF THE DRAWINGS

A preferred embodiment of the present invention is represented in the drawings and will be described in greater detail in what follows.

Shown are in.

DESCRIPTION OF THE PREFERRED EMBODIMENT

Figure 1:
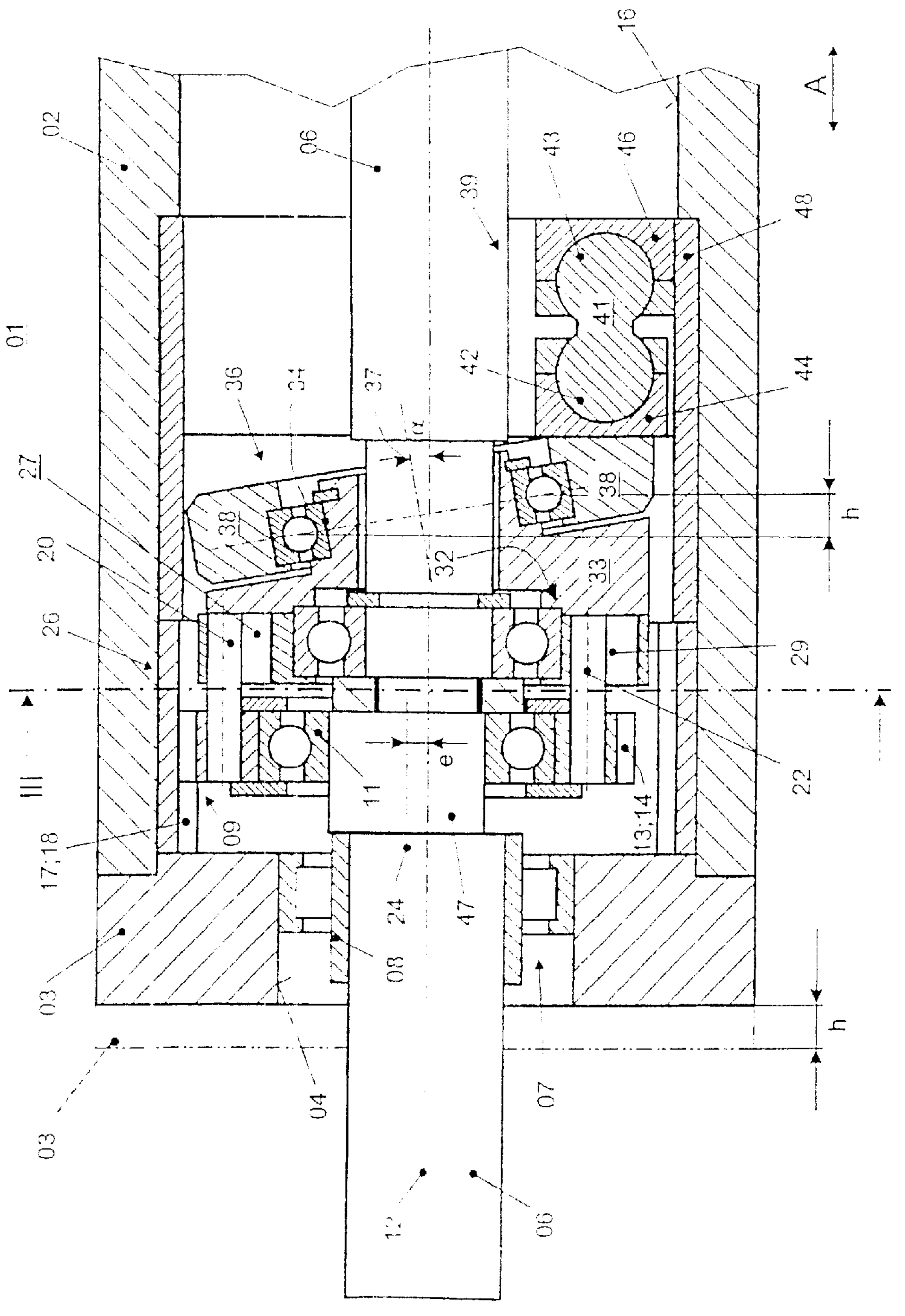
FIG. 1, a longitudinal cross-sectional view through one end of a friction roller in accordance with the invention, FIG. 2, a portion of the cross-sectional view of FIG. 1 with a setting of the axial displacement or lift length of the friction roller which differs from FIG. 1, and in FIG. 3, a greatly simplified depiction of a sectional view taken along line III—III of in FIG. 1 in a first operating position, as well as in a second one, shown in dashed lines, of the two-part coupling of the present invention.

A roller 01, for example a friction roller 01 of an ink unit of a rotary printing press is depicted in FIG. 1, and consists of a roller shell 02, which is closed off on each of its two ends with ring-shaped flanges 03. Each end flange 03 receives, in its central bore 04, a shaft 06, which is seated fixed on a lateral frame, which is not specifically shown, as well as fixed against relative rotation. A bearing, for example a roller bearing 07, is located between the shaft 06 and the bore 04, which roller bearing 07 can be displaced on its inner race 08 in the axial displacement or lift direction A by a defined amount, for example by an axial displacement or lift length "h."

A gear assembly 09, has a first gear wheel 13 with an axis of rotation 24, which first gear wheel 13 is rotatably seated on the shaft 06 by the use of bearings, for example ball bearings 11, as well as being seated eccentrically by an amount "e" with respect to the axis of rotation 12 of the friction roller 01. This first gear wheel 13 is supported on the shaft 06 on an eccentric portion 47 of that shaft, as seen in FIG. 1. An exterior tooth arrangement 14 of the first gear wheel 13 is in engagement with a second gear wheel 18 of the gear assembly 09, which second gear wheel 18 is a ring gear that is fixedly arranged on an interior surface 16 of the roller shell 02 and has an interior tooth arrangement 17. The first gear wheel 13 has approximately 0.9 times the number of teeth of the second gear wheel 18.

On its flank facing away from the end flange 03, the first gear wheel 13 has at least two, but preferably has several, for example four catches, which project out of the flank in the roller axial direction and which are spaced apart. These catches may be, for example, stud bolts 20, 21, 22, 23. The stud bolts 20 to 23 constitute a first portion of a two-part coupling 26. They interlockingly enter into bores 27 to 30 of a second part of the coupling 26, which second part of coupling 26 is rotatably seated on the shaft 06. The second part of the coupling 26 consists of a drive element 33, which drive element 33 is supported by bearings, for example ball bearings 32, on the shaft 06. The drive element 33 functions as the support of an inner race 34 of a rolling bearing, for example a ball bearing 36.

An axis of rotation 37 of the ball bearing 36 extends at an acute angle $\alpha$ of between 5° to 15° with respect to the axis of rotation 12 of the friction roller 01. The obliquely arranged ball roller bearing 36 is used as a lift gear for generating the axial displacement or lift of the roller shell 02 of friction roller 01. This is generated in that an outer race 38 of the oblique roller bearing 36 is interlockingly connected, via a joint 39, with the interior 16 of the roller shell 02.

The joint 39 includes a connecting rod 41, each of whose ends 42, 43 is embodied as a ball portion of a ball and socket joint 44, 46, respectively.

Figure 2:
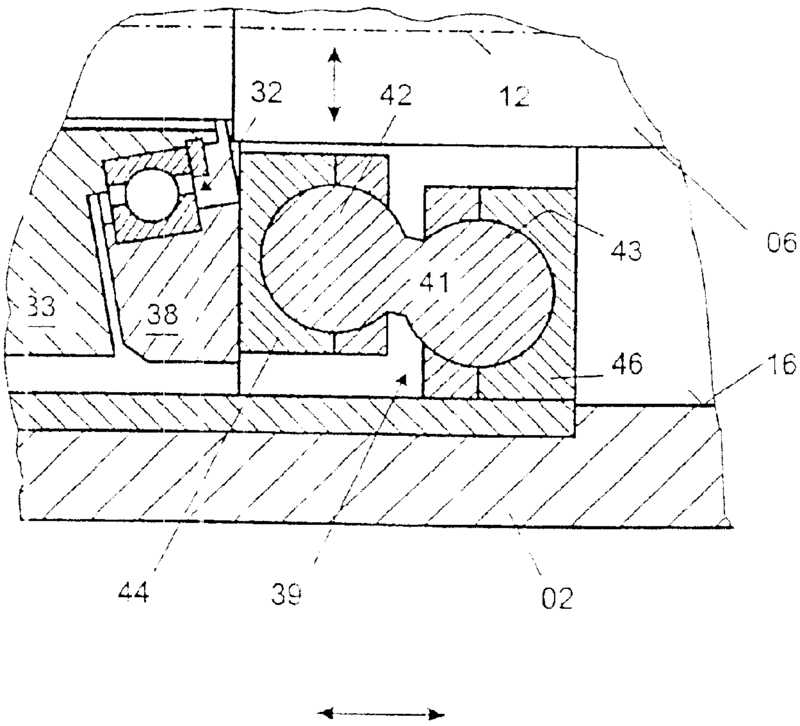

The first ball and socket joint 44 is arranged on the outer race 38 of the oblique ball bearing 36 and is arranged so that it can be pushed back and forth via its ball socket in the direction of the axis of rotation 37 of the ball bearing 36, as shown in FIG. 2. A side face of the first ball and socket joint 44, close to the outer race 38, can be displaced radially by the cooperative engagement of guide beads on the joint face which ride in radially extending grooves of the outer race 38 and arrestably in active contact, in a manner not represented in the drawings.

Because of this adjustable and settable radial positioning of the side face of the first ball and socket joint 44 on the outer race 38 of the oblique ball bearing 36, it is possible to change the axial displacement or lift length "h" represented in FIG. 1, in particular to shorten it in accordance with FIG. 2. A comparison of FIG. 1 and FIG. 2 shows that in FIG. 2 the joint 44 is positioned radially closer to the axis of rotation 12 of the roller 01 than in FIG. 1. This will lessen the length "h" of the axial displacement of the roller sleeve 02.

A diameter D of each bore 27 to 30 in the second part of the two part coupling 26 is at least equal to the diameter d of each stud bolt 20 to 23, plus twice the amount "e" of the eccentricity of the section 47 of the shaft 06.

The axially displaceable friction roller 01 in accordance with the present invention operates as follows:

The roller shell 02, which is rotating on the fixedly clamped shaft 06, is driven by frictional contact with another roller, which is not specifically represented, for example an inking or dampening roller. The first gear wheel 13, which is seated freely rotatable on the eccentric section 47 of the shaft 06, meshes with the interior tooth arrangement 17 of the second gear wheel 18. Because of a difference in the number of teeth between the first and second gear wheels 13 and 18, for example 60 to 66, the first gear wheel 13 is provided with a greater number of revolutions $n_1$ in comparison with a number of revolutions $n_2$ of the roller shell 02 with the second gear wheel 18.

The obliquely arranged drive element 33, which supports the inner race 34 of the oblique ball bearing 36, is rotated via the two part coupling 26. The axial displacement or lift frequency of the roller shell 02 corresponds to the speed difference generated by the two gear wheels 13, 18.

Because of the radial displaceability of the ball socket of the first ball and socket joint 44 on the outer race 38 of the oblique ball bearing 36, it is possible to change the axial displacement or lift length "h" of the roller shell 02, for example to shorten it.

The two part coupling 26 exerts a compensating effect between the eccentrically seated stud bolts 20 to 23, the circumference of each of which rolls off on the inner wall of the bores 27 to 30. The bores 27 to 30 are arranged centered in respect to the axis of rotation 12 of the roller 01, as is shown most clearly in FIG. 3.

Figure 3:
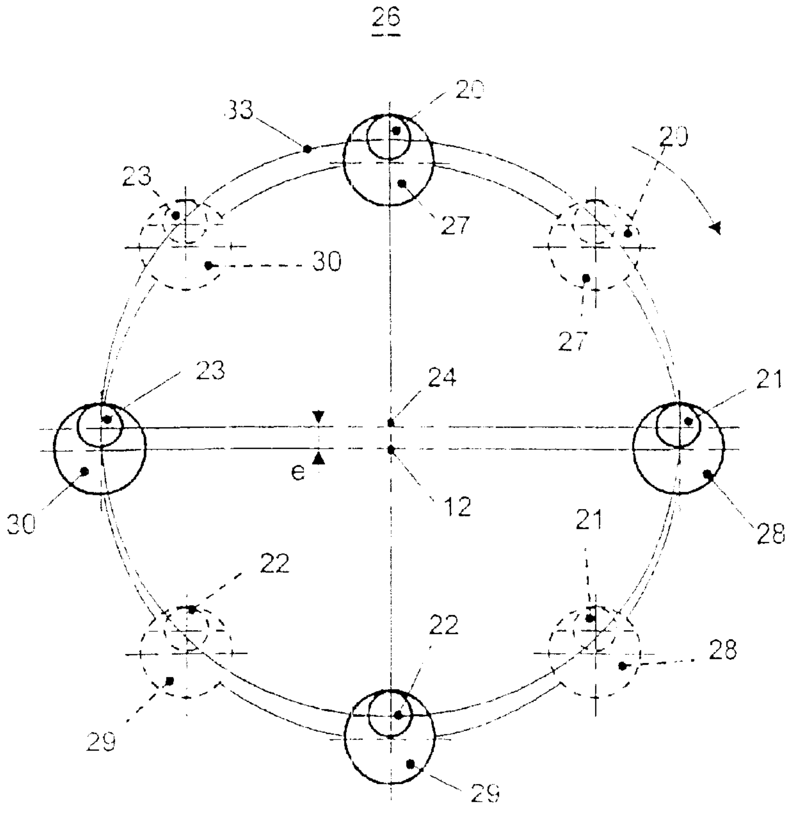

In connection with this, a first position of the stud bolts 20 to 23 and bores 27 to 30, and a dashed second position after a rotation by 45° respectively, are represented in FIG. 3. The ball bearing 32, the sleeve 48, as well as the roller shell 02 are not represented in the sectional representation in accordance with FIG. 3.

In accordance with a preferred embodiment of the present invention, it is provided that the gear assembly 09 for generating a number of revolutions $n_1$ differing from the number of revolutions $n_2$ of the roller shell 02, as well as the means 36, 39 02 for generating the axial displacement or lift "h" can be structured as a compact axial insert into the roller shell 02. To this end a sleeve 48, fixed against relative rotation, is provided on the interior 16 of the roller shell 02. The sleeve 48 is connected to the second ball and socket joint 46, as seen in FIG. 1. Axial movement of the joint 39, in response to the rotation of the drive element 33 and the oblique ball bearing 36 will cause the sleeve to move the roller shell 02 axially by the adjustable axial displacement or lift about "h". The roller end flange 03 will shift axially because of its support by the axial displacement of the roller bearing 07 on its inner race 08.

It is furthermore also possible, in an alternative way, to flexibly connect the inner race 34 of the oblique ball bearing 36 with the interior 16 of the roller shell 02. In that case, the outer race 38 of oblique ball bearing 36 is stationarily arranged in relation to the axial direction A of the friction roller 01.

In accordance with another preferred embodiment, it is possible for the stud bolts 20 to 23 of the coupling to be made of an elastic material. However, the stud bolts 20 to 23 have at least an elastic cover without changing their diameter d.

It is of course also possible to coat the interior of the bores 27 to 30, which are in engagement with the stud bolts 20 to 23, with an elastic material. In that case the diameter D of the bores 27 to 30 is preserved.

While preferred embodiments of a roller with axial travel, in accordance with the present invention, have been fully and completely set forth hereinabove, it will be apparent to one of skill in the art that changes in, for example the overall size of the roller, the supports for the roller shaft and the like could be made without departing from the true spirit and scope of the present invention which is accordingly to be limited only by the following claims.

What is claimed is:

1. A roller with axial displacement comprising:

a roller shaft defining a roller axis of rotation;

a bearing supported on said roller shaft at an oblique angle with respect to said roller axis of rotation;

a roller shell supported by said roller shaft and spaced from said roller shaft;

first and second bearing races of said obliquely supported bearing, said first of said bearing races being stationary with respect to an axial direction of said roller, said second bearing race being connected to said roller shell, said roller shell being displaceable in said roller axial direction and;

a radially adjustable connection point between said second bearing race and said roller shell for changing axial displacement of said roller shell.

2. The roller of claim 1 wherein said first bearing race and said second bearing race have a different number of revolutions which is unequal to a number of revolutions of said roller shell.

3. The roller of claim 1 wherein said obliquely supported bearing is a rolling bearing.

4. The roller of claim 1 wherein said obliquely supported bearing has a bearing axis of rotation that extends at an acute angle of 5° to 15° with respect to said roller axis of rotation.

5. The roller of claim 1 wherein said roller is an ink unit roller of a rotary printing press.

6. A roller with axial displacement comprising:

a roller shaft defining a roller axis of rotation;

a bearing supported on said roller shaft at an obligue angle with respect to said roller axis of rotation;

a roller shell supported by said roller shaft and spaced from said roller shaft;

first and second bearing races of said obliquely supported bearing, said first of said bearing races being stationary with respect to an axial direction of said roller, said second bearing race being connected to said roller shell, said roller shell being displaceable in said roller axial direction; and a flexible connection between said second bearing race and said roller shell, said flexible connection including a connecting rod having first and second ends which each act as a joint.

7. The roller of claim 6 wherein each said joint is a ball and socket joint and wherein a ball socket of said first joint is on said second bearing race and further wherein a ball socket of said second joint is on said roller shell.

8. The roller of claim 7 wherein said ball socket of said first joint is displaceable with respect to an axis of rotation of said bearing to change said axial displacement of said roller.

9. A roller with axial displacement comprising:

a roller shaft defining a roller axis of rotation;

a roller shell supported by and spaced from said roller shaft and having a roller shell interior surface;

a centrally rotating element supported on said roller shaft;

an eccentrically rotating element on said roller shaft;

a coupling between said centrally rotating element and said eccentrically rotating element;

at least first and second catches supported on said eccentrically rotating element and each having a first diameter, said at least first and second catches extending in a direction of said roller axis of rotation;

at least first and second bores on said centrally rotating element, said bores being adapted to receive said catches and each having a second diameter greater than said first diameter;

an exterior tooth arrangement of said eccentrically rotating element; and an interior tooth arrangement fixed on said shell interior surface and meshing with said exterior tooth arrangement.

10. The roller of claim 9 wherein said coupling includes a gear assembly having a first gear wheel eccentrically supported on said roller shaft and having said exterior teeth, said first gear wheel exterior teeth being in gear mesh engagement with said interior teeth on said shell interior surface, said first gear wheel having said first and second catches, said first and second catches being stud bolts.

11. The roller of claim 9 wherein said coupling includes a drive element supported on said roller shaft by a bearing, said drive element forming an inner race of an obliquely arranged bearing.

12. The roller of claim 9 wherein said second diameter is at least the sum of said first diameter plus twice an amount of eccentricity of said eccentrically rotating element.

13. The roller of claim 9 wherein said eccentrically rotating element is part of a gear assembly, said gear assembly being a compact axial insert for said roller shell.

14. The roller of claim 9 wherein said roller is an ink unit roller of a rotary printing press.

15. A roller with axial displacement comprising:

a roller shaft defining a roller axis of rotation;

a bearing supported on said roller shaft at an oblique angle with respect to said roller axis of rotation;

a roller shell supported by said roller shaft and spaced from said roller shaft;

first and second bearing races of said obliquely supported bearing, said first of said bearing races being stationary with respect to an axial direction of said roller, said second bearing race being connected to said roller shell, said roller shell being displaceable in said roller axial direction; and a gear assembly adapted to generate said axial displacement, said gear assembly being a compact axial insert for said roller shell.

* * * * *